May 22, 1923.
A. AGRONOFSKY
1,455,828
COMBINED SCALE AND TONGS
Filed Oct. 4, 1921
3 Sheets-Sheet 1
Fig.1.
Fig.2.
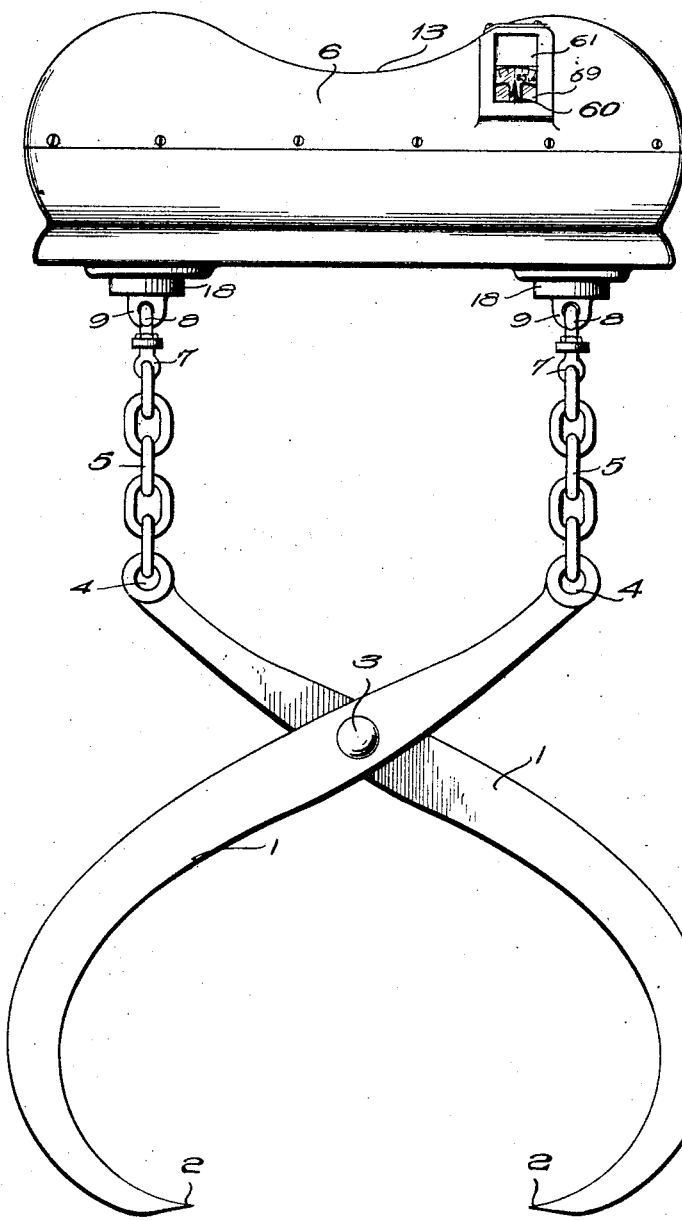
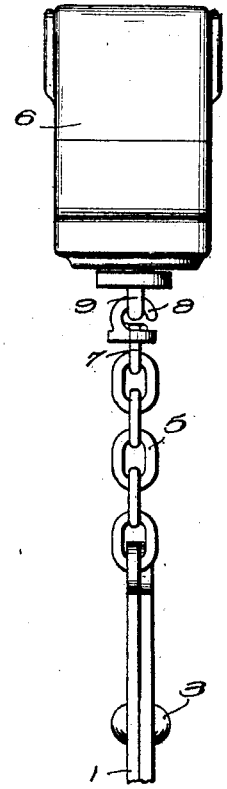
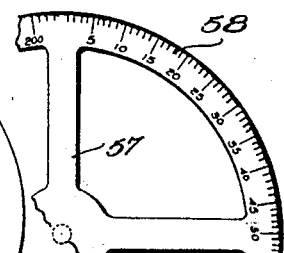
Fig.13.
Inventor
ABRAHAM AGRONOFSKY
By
C. N. Parker Attorney May 22, 1923.
A. AGRONOFSKY
COMBINED SCALE AND TONGS
Filed Oct. 4, 1921
1,455,828
3 Sheets-Sheet 2
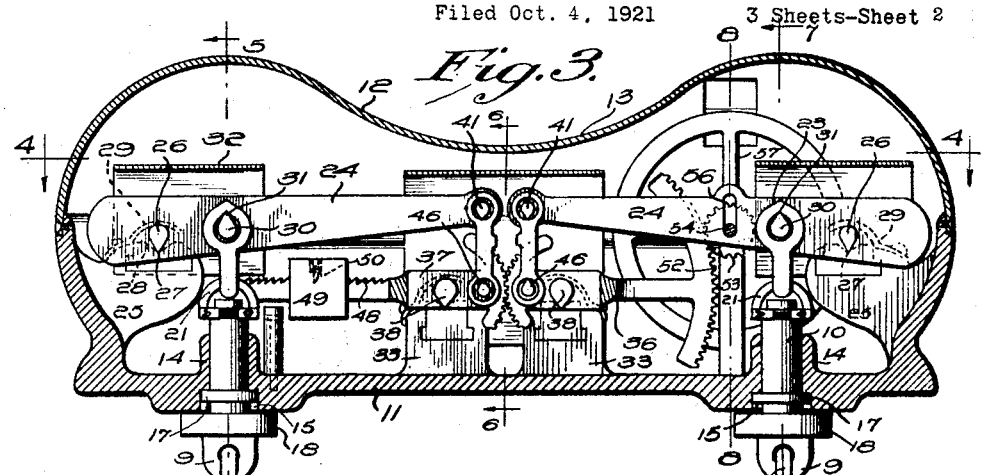
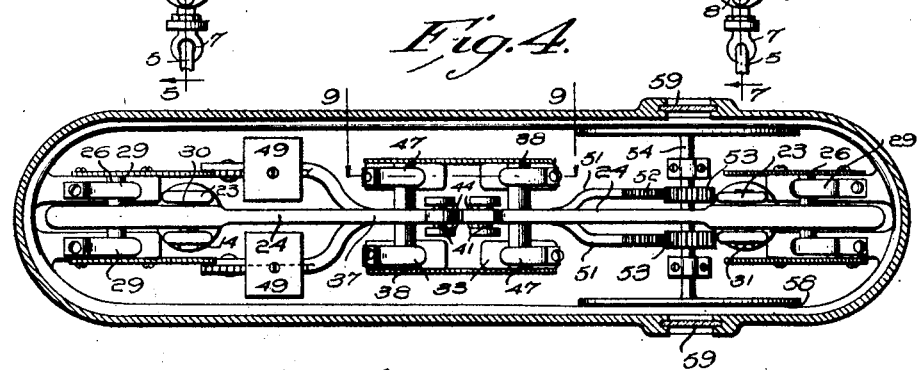
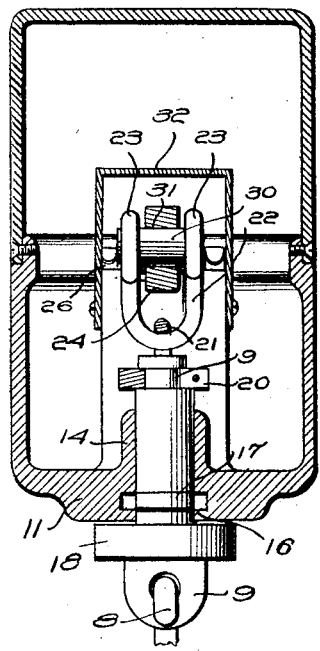
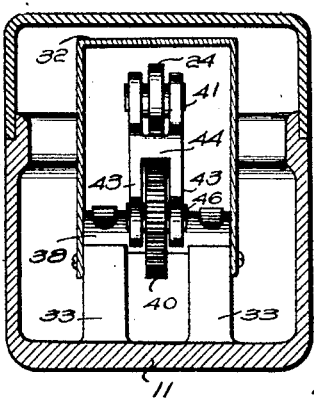
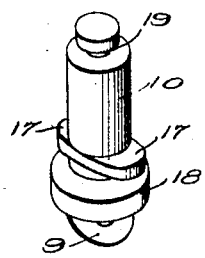
Inventor
ABRAHAM AGRONOFSK
By

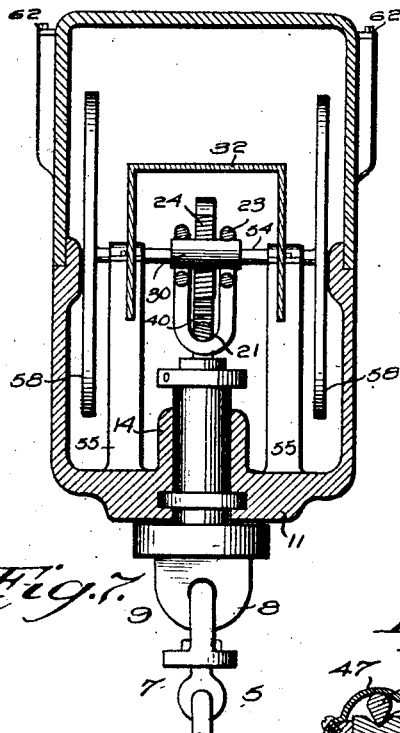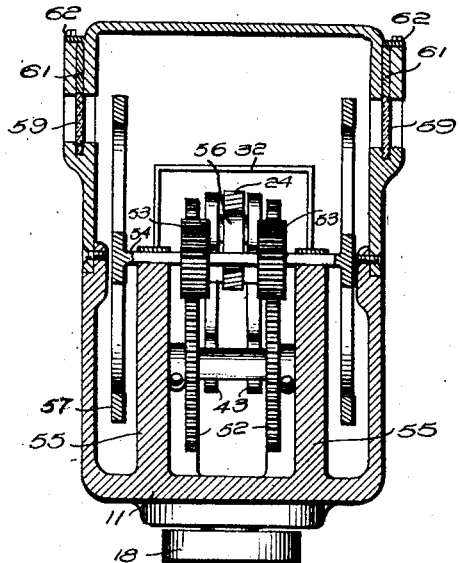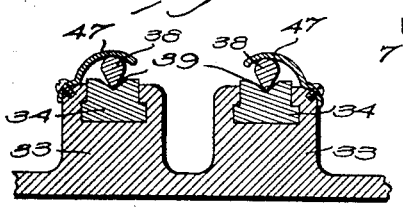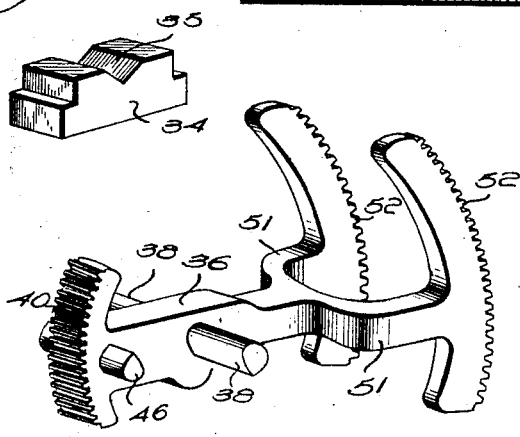

Patented May 22, 1923.

1,455,828

UNITED STATES PATENT OFFICE.

ABRAHAM AGRONOFSKY, OF ST. JOSEPH, MISSOURI.

COMBINED SCALE AND TONGS.

Application filed October 4, 1921. Serial No. 505,332.

*To all whom it may concern:*

Be it known that I, ABRAHAM AGRONOF-SKY, a citizen of the United States, residing at St. Joseph, in the county of Buchanan and State of Missouri, have invented certain new and useful Improvements in Combined Scales and Tongs, of which the following is a specification.

This invention relates to combined tongs and scales and more particularly to ice tongs having a scale arranged therein.

An object of the invention is the provision of a pair of tongs for carrying ice and similar material having a scale arranged in the handle.

A further object is the provision of means for rendering the scale inoperative during transportation of the ice or other material.

A further object is the provision of a scale including a pair of pivoted levers connected to each other by segmental gears or similar means to operate in unison, one of the levers being provided with a counter weight and the other lever being adapted to operate the indicating mechanism of the scale.

A further object is the provision of suitable connecting means between the pivoted levers and the tongs whereby an accurate indication of the weight carried by the tongs will be obtained on the indicator.

In the accompanying drawings, I have shown one embodiment of the invention. In this showing:

Figure 1 is a front elevation,

Figure 2 is a side elevation,

Figure 3 is a central vertical longitudinal sectional view through the handle.

Figure 4 is a horizontal sectional view on line 4—4 of Figure 3,

Figure 5 is a vertical transverse sectional view on line 5—5 of Figure 3,

Figure 6 is a similar view on line 6—6 of Figure 3,

Figure 7 is a similar view on line 7—7 of Figure 3,

Figure 8 is a similar view on line 8—8 of Figure 3,

Figure 9 is a detail sectional view on line 9—9 of Figure 4.

Figure 10 is a detail view of a bearing,

Figure 11 is a detail perspective view of a connecting link,

Figure 12 is a detail perspective view of one of the pivoted levers,

Figure 13 is a detail view of a portion of an indicator wheel, and,

Figure 14 is a detail perspective view of the locking mechanism.

Referring to the drawings, the reference numeral 1 designates tongs of the usual construction provided with lower pointed ends 2, and pivoted to each other at 3. The upper ends of the tongs are provided with eyes 4, adapted to receive the lower links of chains 5. A handle 6 is adapted to connect the chains. As shown, a swivel 7 is arranged on the upper end of each of the chains and this swivel is adapted to receive a hook 8, entering an eye formed in the lower end 9 of a suspension member 10. As shown, the suspension members are arranged in the handle.

The handle is in the form of a hollow casing for the reception of the scale and comprises a lower section 11 and an upper section 12, secured to each other in any suitable manner. As shown, the upper section is provided with a curved upper face which is depressed at 13 to form a relatively shallow portion for the reception of the hand of the user.

The lower section of the casing is provided with suitable bosses 14 having central openings for the passage of the suspension members 10. As shown, the openings are enlarged, as at 15, adjacent the lower end and the enlarged portion of the openings are provided with spaced lugs 16. The suspension member is provided with similarily spaced lugs 17 which are adapted to enter the spaces between the lugs 16 when the scale is to be locked and then turned to the position shown in Figure 5 of the drawings, with the lugs 17 arranged above the lugs 16, preventing downward movement of the suspension member. As shown, the suspension member is provided with a collar 18 arranged beneath the lugs to limit the upward movement. The suspension member extends beyond the boss 14 and is provided with a groove 19 for the reception of a ring or band 20. This ring or band carries an eye 21 adapted to be received in a substantially U-shaped member 22. The arms of the U-shaped member are each provided with eyes 23 which are adapted to be arranged on opposite sides of a lever 24. A pair of levers are provided, arranged at the opposite ends of the casing and connected to the two chains 5 by means of suspension members. Each of these levers is pivotally mounted in a bearing member 25, carried by the lower half of the casing. As shown, a bearing rod 26 having a lower relatively sharp engaging edge 27 passes through the lever and is received in a depression 28 formed in the bearing block. Springs 29 are secured to the bearing block and arranged over the bearing rod on opposite sides of the lever. The eyes 23 formed on the ends of the U-shaped connecting member are likewise adapted to receive a bearing rod 30 extending through the lever and provided with a knife edge engaging surface. A suitable cover 32 may be arranged over the bearings. It will be apparent that when the lugs 16 and 17 are out of alinement with each other, as shown in Figure 3 of the drawings, to permit downward movement of the suspension members, a weight applied to the tongs will cause a downward force to be exerted on the levers 24 through the connections from the suspension members and thus swing the levers downwardly on their pivots. Arranged adjacent the free end of the levers 24, there is provided a pair of bearings 33 extending upwardly from the bottom wall of the casing. These bearings are provided with recesses for the reception of bearing blocks 34. As shown, the upper faces of the bearing blocks are provided with substantially V-shaped cut-away portions 35. Levers 36 and 37 are pivotally mounted in these bearings. The levers are each provided with bearing rods 38, extending transversely thereof and adapted to be received in the cut-out portions 35 of the bearing members. As shown, the bearing rods are provided with knife edged engaging portions 39. The levers are provided with segmental gears 40 on their adjacent ends adapted to mesh with each other. These levers are connected to the levers 24 by suitable mechanism whereby the movement of the levers 24 will be transmitted to the pivoted levers 36 and 37. As shown, the free ends of the levers 24 are provided with bearing rods 41 adapted to be received in eyes 42 formed in the ends of connecting members 43. These connecting members consists of a pair of parallel arms adapted to be arranged on each side of the levers and connected to each other by a web 44. The lower ends of the connecting members are provided with eyes 45, adapted to receive bearing rods 46, carried by the levers 36 and 37. The bearing rods 38 are provided with springs 47 adapted to retain them in engagement with the bearing members 34.

The pivoted lever 37 is provided with ratchet teeth 48 on its upper face and is adapted to receive a counter weight 49. The counter weight may be adjusted longitudinally of the pivoted lever and retained in adjusted position by means of set screw 50. As shown, the pivoted lever 36 is substantially Y-shaped and is provided with a pair of spaced arms 51. These arms are provided with segmental gears 52 adapted to mesh with pinions 53 on a shaft 54. The shaft 54 is mounted in suitable bearings 55 carried by the bottom of the casing. As shown, the adjacent lever 24 is provided with a slot 56 to permit passage of the shaft, the slot being suitably elongated to permit free movement of the lever. A pair of indicating wheels 57 are arranged on opposite ends of the shaft 54. The periphery of the wheel is provided with suitable indicia 58 to indicate the amount of ice or other commodity carried by the tongs. As shown, the upper section of the casing is provided with windows 59 arranged in front of the indicating wheels. An arrow or other indicating mark 60 is arranged on the window to furnish a reading from the indicator wheel. The window 59 may be made of any transparent material, such as glass, and the casing above the window is provided with a slot for the reception of a metal plate 61. If the glass is broken or is removed from the opening forming the window, the metal plate moves to the position normally occupied by the glass to prevent dust and dirt from entering the scales. As shown, a cap 62 is arranged over the opening to permit insertion of new glass or metal plates.

The operation of the device is as follows: When ice or other material is to be carried, the suspension members are forced upwardly into the enlarged openings 15. The lugs 16 and 17 are first arranged out of alinement with each other and the suspension member moved upwardly until the lugs 17 pass the lugs 16. The suspension member is then turned a quarter of a turn and is thus retained in position. The device is then inoperative for weighting purposes and it may be employed as an ordinary pair of ice tongs for carrying. When the user desires to weigh the ice as, for instance, when he enters the place where the ice is to be delivered, the suspension members are turned a quarter of a revolution to bring the lugs out of alinement and the weight of the ice causes the suspension members to move downwardly.

When the suspension members are in unlocked position, the downward movement is transmitted to the levers 24, and thence to the levers 36 and 37 through the connecting members 43. The levers 36 and 37 operate in unison due to the meshing of segmental gears 40 and the counter weight 49 is lifted by the weight of the ice. The movement of pivoted lever 36 causes the indicating wheel to revolve and indicate the weight of the ice. The counter weight is, of course, adjusted so that the proper reading will be obtained. By adjusting the counter weight in any given position, a certain definite leverage is obtained and the weight necessary to offset the movement of the counter weight a predetermined distance may be ascertained. The counter weight is so adjusted that the weight necessary to move it a predetermined distance will be on the reading furnished by the indicator wheel 57 which is moved when the counter weight moves.

The device is particularly advantageous for use in connection with the delivery of ice to homes as it overcomes the objection to short weight by permitting the ice to be weighed in the presence of the buyer when carried into the house.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. A combined scale and tongs comprising a handle, a scale arranged therein, suspension members secured to said scale and extending through said handle, tongs secured to said suspension members, and means for locking said suspension members to said handle.

2. A combined scale and tongs comprising a handle, a scale arranged therein, said handle being provided with a pair of openings, spaced lugs arranged in said openings, suspension members secured to said scales and passing through said openings, tongs connected to said suspension members, and lugs arranged on said suspension members adapted to engage said spaced lugs to lock said suspension members to said handle.

3. A combined scale and tongs comprising a substantially horizontal casing having a reduced portion forming a hand grip, a scale arranged in said casing, said casing being provided with openings adjacent said scale to permit reading thereof, and a pair of tongs connected to said scale adjacent opposite ends of and depending from said handle.

4. A combined scale and tongs comprising a handle, a scale mounted therein, said scale comprising a pair of pivoted levers adapted to operate in unison, a counter weight carried by one of said levers, an indicating wheel adapted to be actuated by the movement of the other lever, a pair of tongs arranged below said handle, and means for connecting said tongs to said scale.

5. A combined scale and tongs comprising a handle, a scale arranged therein, said scale comprising a pair of pivoted levers arranged in substantially longitudinal alinement with each other, segmental gears formed on the adjacent ends of said levers and meshing with each other, a counter weight carried by one of said levers, an indicator wheel adapted to be actuated by the movement of the other lever, a pair of tongs arranged below said handle, and connecting means between said tongs and said levers.

6. A combined tongs and scale comprising a handle, a scale arranged therein, said scale comprising a pair of pivoted levers adapted to operate in unison, a counter weight carried by one of said levers, an indicating wheel adapted to be actuated by the other of said levers, a pair of operating levers arranged adjacent thereto, means for connecting said pivoted levers to said operating levers, suspension members secured to said operating levers and projecting through the handle, and a pair of tongs secured to said suspension members.

7. A device constructed in accordance with claim 6 wherein means are provided for locking said suspension members to said handle to render the scale inoperative.

8. A device constructed in accordance with claim 6 wherein said suspension members are adapted to pass through openings in said handle, said openings being provided with circumferentially spaced lugs, and said suspension members being provided with circumferentially spaced lugs cooperating with said first mentioned lugs to lock said suspension members to said handle.

9. A combined scale and tongs comprising a handle, a pair of pivoted levers mounted in said handle and adapted to operate in unison, means for indicating the movement of said levers, a pair of tongs depending from said handle, and means for connecting said tongs to said levers.

10. A combined scale and tongs comprising a handle, a pair of pivoted levers arranged in said handle, segmental gears formed on the adjacent ends of said levers and meshing with each other, means for indicating the movement of said levers, a pair of tongs arranged below said handle, and means for connecting said tongs to said levers.

11. A combined scale and tongs comprising a handle, a pair of pivoted levers arranged in said handle, segmental gears formed on the adjacent ends of said levers and meshing with each other, a shaft, an indicator wheel fixed to said shaft, a pinion carried by said shaft, a segmental gear carried by one of said levers and meshing with said pinion, a pair of tongs depending from said handle, and means for connecting said tongs to said levers.

12. A combined scale and tongs comprising a handle, a pair of pivoted levers arranged in substantially longitudinal alinement with each other within said handle, segmental gears formed on the adjacent ends of said levers and meshing with each other, a shaft mounted in said handle transversely thereof, an indicating wheel mounted adjacent each end of said shaft, said casing being provided in opposite sides with windows, said wheels being provided with indicia adapted to register with said windows, a pinion carried by said shaft, a segmental gear carried by one of said levers and adapted to mesh with said pinion, a pair of tongs depending from said handle, means for connecting said tongs to said levers, and means for locking said levers against movement.

In testimony whereof I affix my signature in presence of two witnesses.

ABRAHAM AGRONOFSKY.

Witnesses:
L. C. Bowen,
D. W. Lellenstein.